United States Patent [19]

Van Ceulen

[11] 4,070,437
[45] Jan. 24, 1978

[54] PROCESS FOR THE RECOVERY OF METAL CHLORIDES FROM JAROSITE SLUDGES RESULTING FROM THE SULPHURIC ACID PROCESSING OF ORES

[75] Inventor: Alain Van Ceulen, Douai, France

[73] Assignee: Compagnie Royale Asturienne des Mines, Brussels, Belgium

[21] Appl. No.: 645,896

[22] Filed: Dec. 31, 1975

[30] Foreign Application Priority Data

Jan. 7, 1975   France .................................. 75 00293

[51] Int. Cl.$^2$ ........................ C01G 1/06; C01F 11/46; C01G 49/10
[52] U.S. Cl. ........................................ 423/1; 423/491; 423/493; 423/554; 423/555
[58] Field of Search ................... 423/1, 555, 554, 491, 423/493

[56] References Cited

U.S. PATENT DOCUMENTS

| 412,300 | 10/1889 | Selwyn | 423/1 |
|---|---|---|---|
| 863,061 | 8/1907 | Griswold, Jr. | 423/1 |
| 1,305,641 | 6/1919 | Barstow | 423/555 X |
| 1,799,166 | 4/1931 | Hooey | 423/555 X |
| 1,943,341 | 1/1934 | Mitchell | 423/555 X |
| 2,044,942 | 6/1936 | Heckert | 423/555 |
| 3,940,470 | 2/1976 | Kane et al. | 423/491 X |
| 3,988,415 | 10/1976 | Barr | 423/491 X |

FOREIGN PATENT DOCUMENTS

902,337   8/1962   United Kingdom .................... 423/1

*Primary Examiner*—Edward Stern
*Attorney, Agent, or Firm*—Young & Thompson

[57] ABSTRACT

In a process for the recovery of metal chlorides from jarosite in sludges which result from the sulphuric acid processing of ores, the sludge is treated with an aqueous solution of an alkaline earth metal chloride. This solution contains free hydrochloric acid and is in excess stoichiometric ratio to the sulphate content of the sludge. The insoluble materials are separated from the metallic chloride solution by filtering, and are stripped of metallic chlorides by washing and further filtering. The metallic chloride solutions are then collected. The alkaline earth chloride is preferably calcium chloride. The process is particularly, but not exclusively, applicable to recovering metals from jarosite-type sludge resulting from the processing of zinc ore.

9 Claims, No Drawings

PROCESS FOR THE RECOVERY OF METAL CHLORIDES FROM JAROSITE SLUDGES RESULTING FROM THE SULPHURIC ACID PROCESSING OF ORES

The invention relates to the field of recovering chlorides from jarosite sludges resulting from the sulphuric acid processing of ores, and particularly to the case of zinc ores.

To extract the principal metal values from an ore, such as a zinc ore, it is current practice to carry out a sulphuric acid treatment followed by precipitation of the secondary metals in jarosite-type basic sulphate sludges. These sludges are produced in large quantities, and their disposal incurs pollution risks. Further, as well as metals of low value, these sludges contain rarer metals with a high intrinsic value, the recovery of which is not without economic interest.

The texture of such sludges, however, and the presence of sulphuric ions are obstacles to the selective extraction of the metals in an econemically effective manner.

The object of the present invention is a process for recovering chlorides from jarosite sludges resulting from the sulphuric acid processing of ores which yields the metals directly in the form of soluble chlorides, the sulphuric ions being eliminated in the form of insoluble alkaline earth metal sulphates.

SUMMARY OF THE INVENTION

The present invention is directed to a process for recovering metal chlorides from jarosite sludges resulting from the sulphuric acid processing of ores, wherein a. the sludge is treated with an aqueous solution of an alkaline earth metal chloride which contains free acid and is in excess stoichiometric ratio to the sulphate content of said sludge;

b. insoluble products are separated from the resulting metallic chloride solution by filtration;

c. said insoluble products are stripped of metallic chlorides by washing and filtration; and d. said metallic chloride solutions are recovered.

According to this process, the sulphuric ions yield insoluble alkaline earth metal sulphates in an almost quantitative manner, whereas the metals pass into solution in the form of chlorides in an acid medium.

It is advantageous to carry out the process at a temperature close to boiling point.

It is also advantageous if the treatment solution contains an amount of free acid such that the pH at the end of the treatment is less than the pH for precipitation of the hydroxides of the contained metals.

The free acid in the treatment solution and the acid of the stripping solution are preferably hydrochloric acid.

The alkaline earth metal chloride is preferably calcium chloride.

The treatment solution may be formed in situ by mixing hydrochloric acid and a calcium compound containing an anion which is displaceable by the hydrochloric anion. This compound is preferably calcium hydroxide or calcium carbonate.

In a preferred form of the process according to the invention, the free acid in the treatment solution is hydrochloric acid at a concentration between 3N and 9N.

Using this form of the process, almost all the metal content passes into solution in the form of chlorides during the treatment.

When recovering metal chlorides from basic sulphate sludges resulting from the processing of zinc ore, the treatment solution may comprise, per kilogram of dry sludge, substantially 1 kilogram of calcium chloride, substantially 1 liter of 9N hydrochloric acid, and substantially 1.75 liters of water, the treatment lasting substantially 75 minutes at substantially 105° C.

EXAMPLE

To 1410 g of dry jarosite sludges, resulting from the sulphuric processing of a zinc ore, are added 1410 g of calcium chloride, 1380 ml of 9N hydrochloric acid, and 2415 ml of water. These are heated at 105° C for 75 minutes. At the end of this treatment they are hot filtered to separate the solution of metallic chlorides from the insoluble calcium sulphate, the latter representing a dry mass of 830 g.

The results of analyses of the original jarosite sludge and the separated calcium sulphate are shown in the following table:

TABLE

| | METAL CONTENT | | | | | |
|---|---|---|---|---|---|---|
| | Cu | | Pb | | Fe | |
| | g | % | g | % | g | % |
| Jarosite sludge 1410g | 3.67 | 0.26 | 57.00 | 4.04 | 342.34 | 24.28 |
| Calcium sulphate 830 g | 0.08 | 0.01 | 2.08 | 0.25 | 2.82 | 0.34 |
| Recovery yield | 97.82 | | 96.35 | | 99.8 | |

| | Zn | | Ag | | In | |
|---|---|---|---|---|---|---|
| | g | % | mg | ppm | mg | ppm |
| Jarosite sludge 1410 g | 28.34 | 2.01 | 327.1 | 232 | 420 | 300 |
| Calcium sulphate 830 g | 3.32 | 0.4 | 8.3 | 10 | 80 | 100 |
| Recovery yield | 88.29 | | 97.46 | | 81 | |

The very high yields of recovery of the metal chlorides from the basic sulphate sludge will be noted, in a single operation. These metals are in the form of dissolved chlorides and the solution obtained contains very few sulphuric ions, which permits selective extraction, for example by successive liquid/liquid extraction, with good yields. Moreover, the residue of treatment by the process according to the invention is lighter than the original sludge, and is more dense, which reduces the cost of storing it. Also, the residue consists of alkaline earth metal sulphates which do not hydrolise in inclement weather to form sulphuric acid, so that it may be dumped without risking pollution.

It will be well understood that the invention is not limited to the example described, and is open to numerous modifications as to the origin of the residue to be treated and the operating conditions, without exceeding the scope of the invention.

I claim:

1. A process for use in recovering valuable metal chlorides from jarosite sludges resulting from sulphuric acid processing of ores comprising a. contacting the sludge with an aqueous solution of an alkaline earth metal chloride which contains free hydrochloric acid and is in excess stoichiometric ratio to the sulphate content of said sludge so as to dissolve said contained metals in chloride form and precipitate sulphate ions in the form of an alkaline earth metal sulphate;

b. separating insoluble products including said alkaline earth metal sulphate from the metallic chlorides solution resulting from step (a) by filtration;

c. stripping said separated insoluble products of metallic chlorides by washing and filtration; and
d. recovering metallic chloride solutions from steps (b) and (c).

2. A process as set forth in claim 1, wherein said alkaline earth metal chloride is calcium chloride.

3. A process as set forth in claim 1, wherein said alkaline earth metal chloride solution is formed in situ by mixing hydrochloric acid and a calcium compound containing an anion which is displaceable by the hydrochloric anion.

4. A process as set forth in claim 3, wherein said calcium compound is calcium hydroxide or calcium carbonate.

5. A process as set forth in claim 1, wherein said free acid in said treatment solution is hydrochloric acid at a concentration of between 3N and 9N.

6. A process as set forth in claim 5, for recovering metal chlorides from basic sulphate sludges resulting from the processing of zinc ore, wherein said treatment solution comprises, per kilogram of dry sludge, substantially 1 kilogram of calcium chloride, substantially 1 liter of 9N hydrochloric acid, and substantially 1.75 liters of water, the treatment lasting substantially 75 minutes at substantially 105° C.

7. A process as set forth in claim 1, wherein the treatment solution used in step (a) contains an amount of free hydrochloric acid such that the pH of the solution at the end of the treatment of step (a) is less than the pH at which precipitation of hydroxides of said contained metals occurs.

8. A process for use in recovering valuable metal chlorides from sludges of jarosite type resulting from the sulphuric acid processing of zinc ores, comprising
a. contacting the sludge at a temperature close to the boiling point with an aqueous solution of alkaline earth metal chloride which contains free hydrochloric acid and is in excess stoichiometric ratio to the sulphate content of said sludge, so as to dissolve said contained metals in chloride form and precipitate sulphate ions in the form of an alkaline earth metal sulphate;
b. separating insoluble products including said alkaline earth metal sulphate from metallic chloride solution resulting from step (a) by hot filtration;
c. stripping said insoluble products of metallic chlorides by hot washing and filtration; and
d. recovering the metallic chloride solution resulting from steps (b) and (c).

9. A process as set forth in claim 8, wherein said free hydrochloric acid is at concentration of between 3N and 9N.

* * * * *